United States Patent Office 3,549,398
Patented Dec. 22, 1970

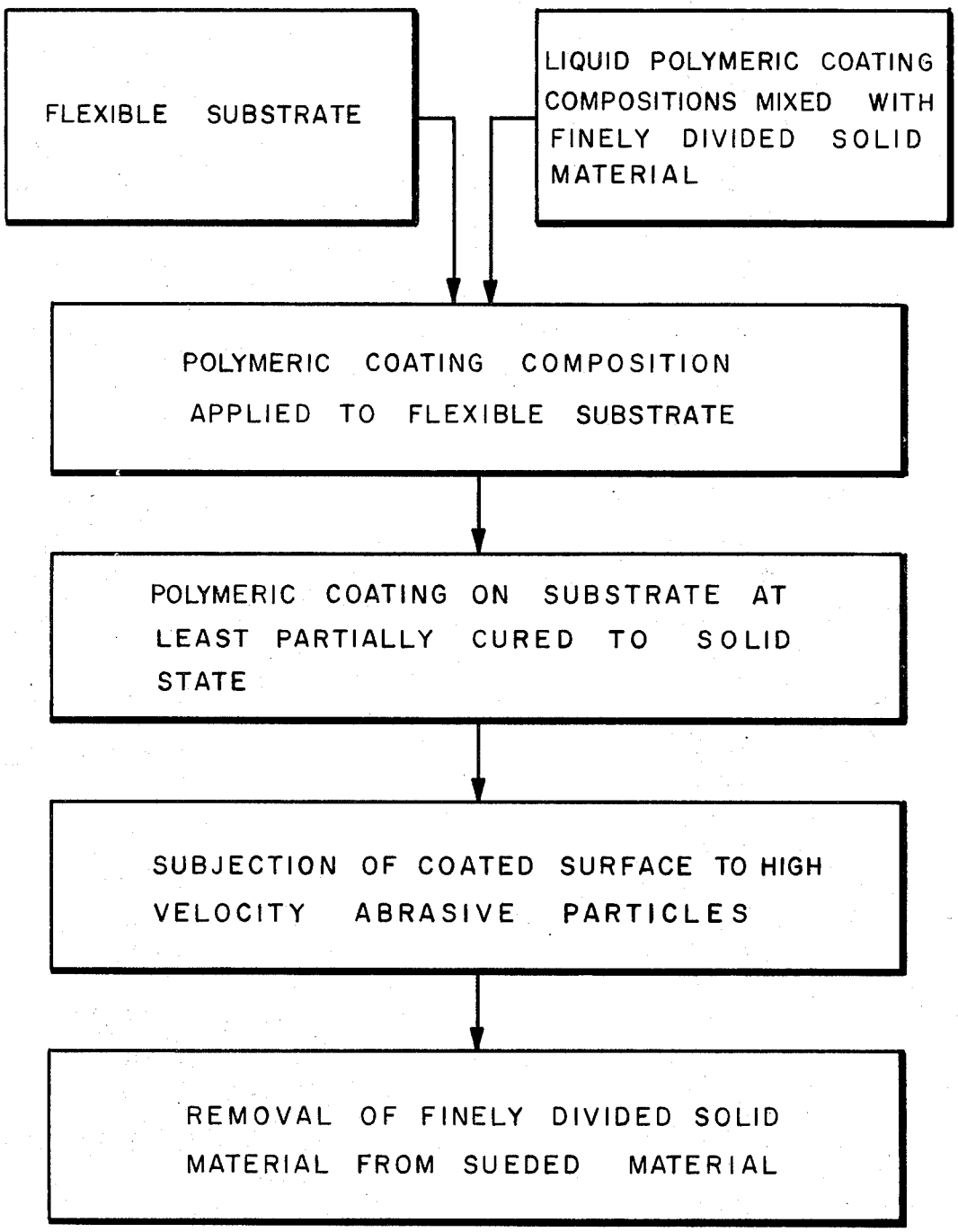

3,549,398
METHOD FOR MANUFACTURING WATER-VAPOR PERMEABLE, SYNTHETIC, SUEDE-LIKE, MATERIAL
George A. Watson, Charlotte, N.C., assignor to Fiber Industries, Inc., a corporation of Delaware
Filed Apr. 3, 1967, Ser. No. 628,024
Int. Cl. D06n 3/04, 3/14
U.S. Cl. 117—8
9 Claims

ABSTRACT OF THE DISCLOSURE

A method for producing a synthetic suede-like leather material utilizing abrasive blasting techniques to abrade the surface of a flexible, elastomeric plastic coating on a fibrous substrate wherein the plastic coating contains removable solid particles.

BACKGROUND OF THE INVENTION

This invention relates to a novel method for sueding synthetic leather. Previously, two general methods have been applicable to the production of a suede-like finish on a synthetic leather material. The most common method, and previously the more preferred method of sueding leather and synthetic leather, was by use of mechanical abrading devices such as sandpaper, emery cloth, grinding stones and the like. While these methods have certain desirable features, they result in a substantial waste of the polymeric coating which is removed during the abrading operation. Thus, in such processes the application of several extra mils of polymeric coating was required to provide for the loss incurred in the abrading action.

Another method previously suggested was to dust the surface of a polymeric coating with a relatively coarse grade of a water soluble salt. After curing, the salt was washed from the polymer surface to yield a suede-like finish.

The present invention overcomes the deficiencies of both prior art techniques and results in substantial advantages by utilizing certain advantages of both previous methods while avoiding the deficiencies of such prior methods.

It is an object of the present invention to provide a method of producing a water-vapor permeable suede-like material utilizing a novel abrasive method which eliminates or greatly reduces polymeric losses previously associated with abrasive techniques. It is another object of this invention to provide a novel method for adapting abrasive blasting techniques for use in abrading elastomeric materials which previously were known to be unaffected by such techniques. These and other objects will become apparent to those skilled in the art from the description of the invention which follows:

SUMMARY OF THE INVENTION

In accordance with the invention, a method for producing synthetic suede-like material is provided comprising applying an elastomeric polymeric coating to a flexible substrate, said elastomeric polymeric coating having intimately incorporated therein finely divided particles of a solid substance insoluble in said polymeric coating, at least partially curing said applied polymeric coating and subsequently subjecting said polymeric coating to a stream of high velocity abrasive particles, thereby producing a suede-like finish on said plastic coating. The finely divided particles are preferably decomposable, volatile or soluble in at least one solvent in which said polymeric coating is not soluble so that the solid particles can be subsequently removed from the sueded material, thereby resulting in a water-vapor permeable synthetic suede-like leather material.

The present invention is particularly useful for the production of textured suede, corduroyed suede, embossed suede and the like suede-like materials. High and low profile sueding is readily achieved by the present process as well as design embossing using varying degrees of sueding to achieve the desired pattern. Pantographic techniques are particularly useful to provide specifically desired designs, textures and the like which cannot readily be produced by previous sueding techniques.

The invention will be described more fully with reference to the drawing which is a flow sheet representing the process steps of the present invention.

The flexible substrate on which the polymeric coating is applied may be most any flexible sheeting such as paper, plastic and the like, but preferably the substrate is a fibrous composition which may be woven, knitted, braided, twisted, nonwoven or the like, natural, that is, animal, vegetable and mineral fibers or synthetic fibers or mixtures thereof. The particular substrate used is not critical to the practice of the invention. Therefore, a substrate of fibrous materials, such as cotton, flax, jute, silk, wool, asbestos, nylon, rayon, polyester, polyamide, polyethylene, polypropylene, polyurethane, polyvinyls and the like fibers can be used as well as cellulose based substrates. The substrates may be filled or non-filled with a resinous material such as a polyester, polyurethane, latex or the like natural or synthetic polymeric material. Also, if desired, the fibrous material can be laminated with other fibrous materials or with a synthetic plastic sheet material.

The most preferred substrate is a nonwoven composition, preferably a blend of synthetic fibers such as polyester staple and polypropylene staple needled to a high density such as that obtained in needling the batting with about 2000 to 10,000 punches per square inch. The needled substrate can be subsequently shrunk, if desired, and/or impregnated with a binding agent. The prepared substrate is preferably of a thickness of about 0.02 to about 0.08 inch thick and has a tensile strength at 5% elongation of about 5 to 1600 pounds per linear inch or more and more preferably about 900 to 1200 pounds per linear inch. The denier of the structural fiber component can vary widely. It can be as great as about 30 denier per filament or more but normally, fibers of about 0.5 to 3 denier per filament are preferred because they are easier to handle and give a product of greater pliability, toughness and scuff resistance.

The flexible polymeric coating or elastomer used may be any of the numerous plastic materials commonly used in the manufacture of synthetic leather and similar products. Many different synthetic polymers are utilized for this purpose, all of which are well known in the art. Such materials retain a leather-like flexibility after final cure and thus are best defined as elastomeric or flexible polymers. These polymers normally are further characterized as being difunctional prior to final cure, thereby polymerizing into linear polymers during the final cure. However, polymers in a suitable solvent which is removed to harden the polymer are also applicable.

Typical of the compositions used are polyurethanes which may be of the foaming or non-foaming type, particularly polyester polyamides diisocyanate reaction products, polyester, polyethers and the like. The terms "polymeric coating," "elastomeric material" and "flexible coating" as used herein, refer to polymeric film-forming material composed either of pure polymer or blends thereof with or without additives, such as curing agents, coloring agents, plasticizers, stabilizers and fillers.

A preferred polymeric coating composition useful with the present invention is a polyurethane elastomer made by reacting an organic diisocyanate with an active hydrogen containing polymeric material such as a polyalkyleneether glycol, a hydroxyl containing polyester or a polyester polyamide to produce an isocyanate-terminated polyurethane prepolymer and reacting the resulting prepolymer with a chain-extending compound having two active hydrogen atoms bonded to amino-nitrogen atoms. Hydrazine and N-methyl-aminobis-propylamine are typical chain extenders. However, others which are useful include dimethyl-piperazine, 4-methyl-m-phenylene-diamine, m-phenylene-diamine, 1,4-diamino-piperazine, ethylene diamine and mixtures thereof.

The polyurethane elastomer can be prepared by first mixing a molar excess of the diisocyanate with the active hydrogen containing polymeric material and heating the mixture at about 50–120° C. until the prepolymer is formed. Or, the diisocyanate can be reacted with a molar excess of the active hydrogen containing polymeric material, and the reaction product capped by reacting it with more diisocyanate to form the prepolymer. Numerous variations of these basic reactions are known and can be used in the present process.

Aromatic, aliphatic and cycloaliphatic diisocyanates or mixtures thereof can be used in forming the prepolymer. Such diisocyanates are, for example, tolylene-2,4-diisocyanate, tolylene-2,6 - diisocyanate, m - phenylene diisocyanate, biphenylene - 4,4'-diisocyanate, methylene bis (4-phenyl isocyanate), 4 - chloro - 1,3 - phenylene diisocyanate, naphthalene-1,5 - diisocyanate, tetramethylene-1,4-diisocyanate, hexamethylene-1,6-diisocyanate, decamethylene - 1,10 - diisocyanate, cyclohexylene - 1,4-diisocyanate, methylene bis(4-cyclohexyl isocyanate) and tetrahydronaphthalene diisocyanate. Arylene diisocyanates, that is, isocyanates in which the isocyanate groups are attached to an aromatic ring are preferred. In general they react more readily than do alkylene diisocyanates.

Polyester polyamides and polyalkyleneether glycols are the preferred active hydrogen containing polymeric materials for the prepolymer formation. The most useful polyglycols have a molecular weight of 300 to 5000, preferably 400 to 2000, and include, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain such as, for example, the compound $HO(CH_2OC_2H_4O)_nH$ wherein $n$ is an integer greater than 1 can also be used.

The polyesters and polyester polyamides are formed by conventional processes such as by reacting acids, esters or acid halides with glycols. Suitable glycols are polymethylene glycols, such as ethylene-, propylene-, tetramethylene-, decamethylene glycol, substituted polymethylene glycols such as 2,2-dimethyl - 1,3 - propanediol, cyclic glycols such as cyclohexanediol and aromatic glycols such as xylylene glycol. Aliphatic glycols are generally preferred when maximum product flexibility is desired. These glycols are reacted with aliphatic, cycloaliphatic or aromatic dicarboxylic acids or lower alkyl esters or ester forming derivatives thereof to produce relatively low molecular weight polymers, preferably having a melting point of less than about 70° C., and molecular weights like those indicated for the polyalkyleneether glycols. Acids for preparing such polyesters are, for example, succinic, adipic, suberic, sebacic, terephthalic and hexahydroterephthalic acids and the alkyl and halogen substituted derivatives of these acids.

The chain extension reaction is usually carried out at a temperature below 120° C. and often at about room temperature, particularly for hydrazine-extended polymers. During the reaction, prepolymer molecules are joined together into a substantially linear polyurethane polymer, the molecular weight of which is usually at least 5000 and sometimes as high as 300,000. The reaction can be carried out without a solvent although a solvent is often used to obtain the most desired application viscosity.

Other coating polymers that can also be used include various polyesters, polyethers, vinyls, such as polyvinyl chloride, polyvinylidene chloride, vinyl chloride-vinyl acetate copolymers, vinyl chloride-vinylidene chloride copolymers and mixtures of the same and the like. In addition, other suitable polymers include copolymers of vinyl chloride or other vinyl halides with monomers such as vinyl acetate, vinylidene chloride, diethyl maleate and vinyl acetals such as vinyl butyral chloride. Such polymers may or may not contain plasticizers as may be desirable to yield the more preferred hand and drape to the finished coated product.

Prior to the application of the polymeric coating material to the substrate, a finely divided solid material, insoluble in the coating composition and nondeleterious to and nonreactive with the resin or solvent therefor is intimately incorporated into the coating composition. The solid material is preferably one which can be removed from the polymer after curing by various means such as decomposition, volatilization, solubilization or the like. The most preferred finely divided solid materials incorporated into the coating composition are water or alcohol soluble materials which do not fuse, decompose or volatilize at the temperature utilized to cure the coating composition. Cure temperatures are normally below about 150 degrees centrigrade, therefore, useful solid materials can be any of numerous substances. However, the preferred materials are inorganic materials such as salts or mixtures of salts, especially alkali metal salts such as sodium and potassium chlorides, bromides, sulfates, ammonium sulfate and the like, of which sodium chloride is the most preferred. However, materials which volatilize above the curing temperature and below the polymer degradation temperature, such as ammonium acetate can also be used with correspondingly good results.

The solid materials is preferably of a U.S. Standard Sieve Number less than about 60 and preferably less than about 200 and most preferably that which passes through a U.S. Standard Sieve Number 325.

The solid particles are incorporated into the polymeric coating material, preferably by intimately mixing the solid particles and polymer in a proportion by weight of about 1:1 to 6:1 and more preferably in a proportion of about 4:1 to 3:1 salt to resin. The particular amount of solid material used and particle size thereof affects the gas permeability as measured by water vapor permeability of the resulting product and the ease with which a coated mateiral can be seubsequently abraded by the method of the present invention. A greater content of finely divided material increases the porosity of the finished product as well as the surface hardness of the coated product which in turn increases the ease of abrading by high velocity abrasive particles.

The prepared coating composition is applied to the fibrous substrate by any of a number of methods including spraying, brushing, spreading and the like. For example, particularly desirable methods are the floating knife method, calendering, cast-coating, roller-coating and the like. The most preferred method is to use a doctor blade technique, whereby the composition is applied as a viscous liquid which may or may not contain a solvent depending on the temperature of application and the preferred viscosity for such application.

The application can be effected in a single or multitude of successive applications or coats with or without partial or complete cure between successive coats. The most preferred method of application is by successive coatings of about 1 to 3 mils per coating with partial curing between each successive layer. However, various other techniques are equally applicable, the particular technique utilized depending primarily on the polymeric coating composition used. However, it is preferred that coating be applied to the substrate to achieve a finally cured coating of a thickness of 3 to 100 mils and more preferably of 10 to 50 mils and most preferably of about 30 mils.

During or on completion of the coating operation, the coating can be embossed, corduroyed or otherwise textured as may be desired. The embossing is preferably effected to a depth sufficient to retain the embossed design after the sueding operation.

The fibrous coated product is then subjected to the abrasive action of high velocity abrasive particles. Such techniques are commonly referred to as blast cleaning shot peening or sand-blasting. In utilizing this technique the various known abrasive substances are used. Such abrasive particles include various metal, vegetable matter and inorganic compounds. More specifically, the abrasive particles include sandcast chilled iron, malleable iron shot and grit, steel shot and grit, cut wire, nail clippings, nonferrous metal particles such as copper, aluminum, aluminum oxide, slag and the like, various vegetable matter such as crushed walnut shells, pecan shells, rice hulls, rye husks, corn cobs, peach pits, apricot pits, various inorganics such as boron carbide, quartz sand, silica cand, silicon carbide, garnet, novaculite, dolomite, pumice, flint, quartz and the like. The particular abrasive particle used is preferably of a hardness greater than the hardness of the applied elastomer and preferably has a hardness in the range of a Rockwell C 30 to about 70. Particles in this hardness range readily abrade the synthetic leather in the desired manner.

The preferred particle size used is that which passes through a U.S. Standard Sieve Size Number 16 and more preferably is in the range of particles passing through a U.S. Standard Sieve Number 40 and being retained on a Sieve Number 200 and most preferably, in the range passing through a U.S. Standard Sieve Number 50 and being retained on a U.S. Standard Sieve Number 70. The blasting can be either of the wet or the dry technique. Dry blasting is preferred. In using the dry method, any of the various propelling means can be utilized, particularly compressed air and centrifugal force. Centrifugal force is commonly the more preferred for large area coverage while detail work is more readily effected using air pressures in the range of 50 to 120 pounds per square inch and nozzle openings of about ¼ to ⅜ inch. However, it is readily recognized that numerous other techniques can be utilized as will be readily apparent to those skilled in the art.

When wet blasting is utilized, water is the preferred carrying medium although various other liquids can also be used. When using water as the carrier, water pressures in the range of 50 to about 120 pounds per square inch or more are normally used.

The velocity of the particle is dependent on the particular technique utilized and the particle size. It is readily recognized that the larger sized particles result in a greater impact on the surface being abraded at comparable velocities and therefore accelerate the abrading process and the depth thereof. Thus, the velocity can be varied with both the apparatus utilized and the particle size used in the particular application. Velocities obtained under air pressures of 50 to 120 pounds per square inch in the stated particle range have been found to be highly effective. When using centrifugal force equipment, correspondingly higher and lower velocities can be obtained as are desired or as are limited by the particular equipment being used.

Using the present technique, various novel sueding processes are readily effected. Particularly, low profile sueding is readily effected wherein the grooves of an embossed or corduroyed material can be sueded rather than the high points. Also, both high and low profile surfaces are readily sueded as may be desired to obtain a particular effect. Pantographic techniques with or without masking can also be used to provide specific effects such as heavier and lighter sueding, decorative designs and the like.

On completion of the abrading operation, the resulting product has a suede-like appearance and texture. The solid particles incorporated into the polymeric coating are then removed from the polymeric coating by decomposition, volatilization or most preferably by washing in a solvent for the solid particles. When sodium chloride is the solid material used, the sueded product is washed in water for a period of time sufficient to remove substantially all of the salt from the polymeric coating.

The following examples illustrate certain preferred embodiments of the present invention. Unless otherwise indicated, all parts and percentages are by weight.

EXAMPLE 1

A suede artificial leather was made in accordance with the present invention by forming a substrate of batting comprised of a mixture of 55 percent of 1.5 denier per filament, 1½ inch drawn polyester staple and 45 percent of 1.8 denier per filament of 1½ inch drawn polypropylene staple. The blend was fed into a garnett to form an intimately blended web, which was then cross-lapped to produce a web of a density of 24 ounces per square yard. The web was passed through a needle puncher wherein the web was needled to about 4000 punches per square inch. The batting was then shrunk 20 percent in length and width to provide an overall shrinkage of about 35 percent. The flexibility and draping qualities were improved by impregnating the batting with a polyurethane latex binding agent at a 50 percent weight by solids based on the dry fiber polyurethane pickup. The polyurethane serves primarily as a filler and also increases strength while maintaining the original water vapor permeability. The impregnated batting was then of a thickness of 0.085 to 0.095 inch. It was then split into two felts and sueded to a thickness of about 0.026 inch.

The elastomeric coating composition was then prepared by mixing 167 parts of sodium chloride with 116.4 parts of Daltoflex 1S, a polyester polyamide diisocyanate prepolymer manufactured by ICI, dissolved in methylethyl ketone to 27 percent solids. Subsequently, 3 parts of Suprasec K2 diisocyanate curing agent for the prepolymer at 40 percent solids in methylethyl ketone and 6 parts of 1.8 percent solution of dimethylphenethylamine in methylethyl ketone were mixed with the prepolymer composition. The sodium chloride was of a finely divided particle size which passed through a 325 U.S. Standard Sieve Number. The salt addition resulted in a salt-polymer ratio of 4 to 1 by weight of solids.

The prepared salt polymeric mixture was then applied to the prepared fibrous substrate in a wet thickness of about three mils per application in a multiple of applications with solvent removal after each subcoat application. A total of about 30 mils of polymeric coating was product was then cured for 24 hours at 50 degrees centigrade. The resulting product was then divided into two samples. One sample was leached for 8 hours in water to remove the salt from the polymeric coating thereby providing a water-vapor permeable leather-like material. The other sample was not leached.

The coated surfaces of both samples of the prepared synthetic leather were then subjected to abrasive particle blasting utilizing silica sand particle sof 50 to 70 U.S. Standard Sieve Number as the abrasive material. The particles were propelled by compressed air at about 90 pounds per square inch through a ⅜ inch nozzle. It was immediately observed that even prolonged attempts to abrade the sample from which the sodium chloride had been leached were of no avail. The flexible coating merely reflected the abrasive particles without noticeable effect to the coated surface. However, the sample containing the unleached sodium chloride was readily and easily abraded, thereby leaving a suede-like appearance and texture on the surface of the artificial leather. Using reciprocating sandblasting heads, a uniformly sueded appearance was obtained.

On completion of the sueding operation, the product was then washed with water to remove the sodium chloride salt contained in the polymer. The resulting product had a suede-like finish and was permeable to water vapor.

In the same manner, other flexible polymeric coatings are applied to woven and nonwoven substrates, utilizing sodiumchloride, potassium chloride, sodium nitrate, potassium nitrate, ammonium sulfate and the like soluble salts to produce an artificial leather having a surface hardness sufficient to be readily abraded by high velocity abrasive particles thereby obtaining correspondingly good results. On completion of the abrasive operation, the soluble salt is removed by washing thus producing in a vapor permeable suede-like product.

EXAMPLE 2

A synthetic leather material is prepared in the manner of Example 1, wherein the polyurethane is applied to the nonwoven substrate. Prior to the complete curing of the elastomeric coating, the surface thereof is embossed to produce high and low profile surfaces. The low surfaces, recesses or grooves are sueded by masking the high surfaces with rubber matting and blasting the low surfaces in the manner of Example 1. Thus, a sueded low profile embossed product is obtained.

In the same manner, without masking, the high surfaces of the embossed material, both the high and low surfaces are sueded in by blasting in the manner of Example 1. Thus, a high-low profile sueded product is produced.

In the same manner, napped low profile, high and low profile, flat napped, mass napped and whiskered finishes are readily obtained by embossing, corduroying, masking and the like, the prepared polymeric coating either prior to or during the blasting operation. Pantographic techniques are particularly useful to obtain desired designs and effects on the resulting sueded product.

While there have been described various embodiments of the present invention, it is understood that various changes therein can be made without departing from the scope of the invention. It is therefore intended that the invention is to be covered broadly, being limited only by the appended claims.

What is claimed is:

1. A method for producing a synthetic suede-like water-vapor permeable leather material comprising applying applying an elastomeric polymeric coating to a flexible substrate, said elastomeric polymeric coating having intimately mixed therewith finely divided particles of a solid substance insoluble in said flexible polymeric coating, said finely divided particles being soluble in at least one solvent in which the elastomeric coating is not soluble, at least partially curing said applied coating, subsequently subjecting said elastomeric coating containing said solid particles to a stream of high velocity abrasive particles and producing a suede-like finish on said elastomeric coating, dissolving and removing said finely divided particles from said elastomeric coating after subjecting said coating to said abrasive action.

2. The method of claim 1 wherein the flexible substrate is a porous, fibrous material.

3. The method of claim 2 wherein said fibrous substrate is a nonwoven needled fabric.

4. The method of claim 1 wherein the surface of the elastomeric coating is embossed prior to subjecting to said abrasive particles.

5. The method of claim 1 wherein the finely divided particles of solid substance are of a particle size which passes through U.S. Standard Sieve Size Number 325.

6. The process of claim 1 wherein the finely divided particles of solid substance are sodium chloride particles.

7. The process of claim 1 wherein the solid substance is mixed with said elastomeric polymer in a ratio of about 1:1 to 6:1 solid to polymer by weight.

8. The process of claim 1 wherein the abrasive particles are of a particle size of 16 to 200 sieve size and a hardness of Rockwell C 30 to about 70.

9. The process of claim 1 wherein the elastomeric polymer is a polyurethane.

References Cited

UNITED STATES PATENTS

| | | | |
|---|---|---|---|
| 2,448,316 | 8/1948 | LeSavoy | 51—319 |
| 2,774,679 | 12/1956 | Remer | 51—321 |
| 2,811,464 | 10/1957 | Stiehl et al. | 117—11 |
| 2,837,440 | 6/1958 | Boivin | 117—11 |
| 3,067,483 | 12/1962 | Hollowell | 161—64 |
| 3,287,196 | 11/1966 | Koller | 156—254 |
| 3,337,388 | 8/1967 | Wosaba | 161—64 |

FOREIGN PATENTS

| | | | |
|---|---|---|---|
| 1,058,011 | 5/1959 | Germany | 161—64 |

ROBERT F. BURNETT, Primary Examiner

R. H. CRISS, Assistant Examiner

U.S. Cl. X.R.

51—319; 117—11, 63, 135.5; 161—63, 64, 154, 159